(No Model.)
W. H. SILVER.
EGG POACHER AND EGG FRIER.
No. 352,272. Patented Nov. 9, 1886.
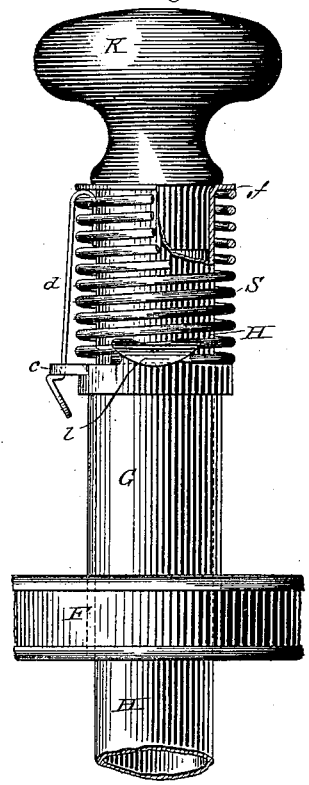
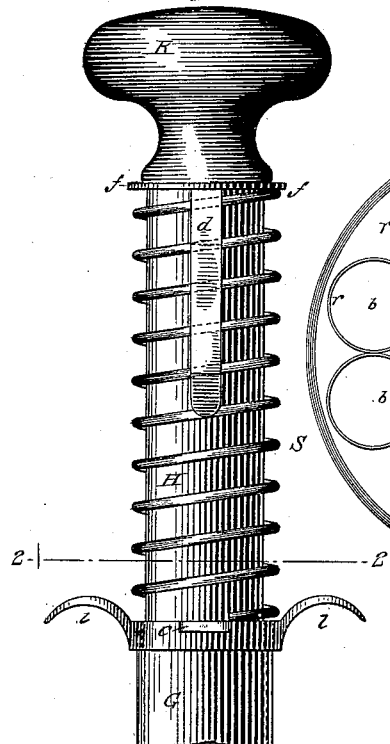
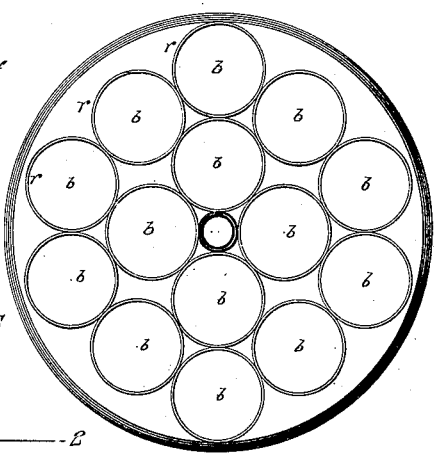
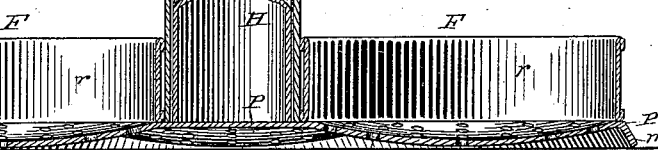
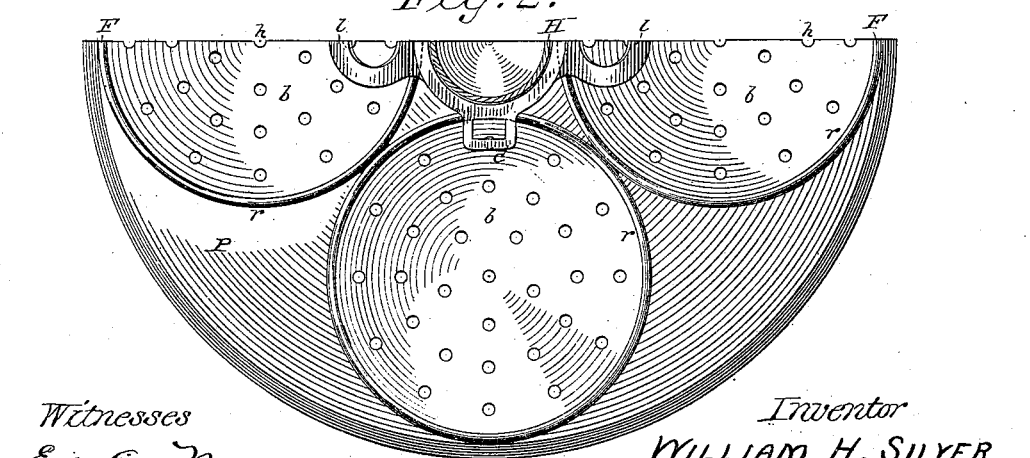
Witnesses
Ed. A. Newman
Al. C. Newman
Inventor
WILLIAM H. SILVER,
By his Attorney
Jas. L. Ewin.
N. PETERS, Photo-Lithographer, Washington, D. C.

United States Patent Office.

WILLIAM H. SILVER, OF NEW YORK, N. Y.

EGG-POACHER AND EGG-FRIER.

SPECIFICATION forming part of Letters Patent No. 352,272, dated November 9, 1886.

Application filed December 2, 1885. Serial No. 184,500. (No model.)

*To all whom it may concern:*

Be it known that I, WILLIAM H. SILVER, a citizen of the United States, residing at New York, in the State of New York, have invented a new and useful Improvement in Egg-Poachers and Egg-Friers, of which the following is a specification.

This invention relates to that class of utensils for poaching or frying eggs in which the eggs are separately confined and shaped by a "nesting-frame" of curb-rings upon a "surface-plate," and are exposed, so as to facilitate their removal from the latter when cooked by elevating the nesting-frame.

The present invention consists, first, in the combination, with a superposed nesting-frame, of a surface-plate having depending shallow cups or bulbs integral therewith and perforated with small holes, and a depending rim surrounding the area within which said bulbs depend, whereby the escape of the boiling liquid laterally from beneath the surface-plate is prevented, and it is caused to ascend through the perforations of the bulbs, so as to cook the eggs rapidly and keep them from adhering.

It consists, further, in the combination of a surface-plate having a central handle fixedly attached thereto perpendicular to its upper surface, a superposed nesting-frame movable vertically clear of said surface-plate, and having a handle by which to so lift it relatively to said surface-plate, and a central spring which normally holds said nesting-frame down upon said surface-plate, so as to provide for holding the nesting-frame down upon the surface-plate at all points during the cooking operation and preliminary thereto, and for so elevating the nesting-frame as to expose the cooked eggs on all sides, and thus to facilitate their removal from the surface-plate.

A sheet of drawings accompanies this specification as part thereof.

Figure 1 of the drawings is a partly-sectionized elevation of an egg-poacher illustrating my said invention. Fig. 2 is a half-plan of the same in horizontal section on the line 2 2, Fig. 1. Fig. 3 represents a partly-sectionized elevation of its upper portion from a different point of view as compared with Fig. 1, showing the nesting-frame in elevated position; and Fig. 4 is a small-scale plan illustrating the enlargement of its capacity.

Like letters of reference indicate corresponding parts in the several figures.

Said egg-poacher, Figs. 1, 2, and 3, has as its base a circular surface-plate, P, provided with shallow depending cups or bulbs $b$, integral therewith, their concavities merging into its upper surface, and each having numerous perforations or small holes, $h$, and with a depending marginal flange, $m$. Fitted to said plate is a nesting-frame, F, composed of several curb-rings $r$, united in one plane, as heretofore, said bulbs being so located in the former as to coincide with these rings. This nesting-frame, instead of being hinged to the surface-plate, as before, is movable vertically to an elevated plane parallel to that of the surface-plate, as illustrated by Fig. 3, so as to equally and fully expose all the bulbs of the latter. A handle-stem, H, is fixedly attached to said plate P, perpendicular thereto, and is provided at its upper end with a knob, K, (for which any preferred handle may be substituted,) a stop-flange, $f$, and a depending spring-detent, $d$. A guide-sleeve, G, fitted to said handle-stem, is fixedly attached to said frame F, and provided at its upper end with a pair of lifting-lugs, $l$, and a catch-staple, $c$; and a spiral spring, S, embracing said handle-stem, is interposed between said stop-flange $f$ at its upper end and the upper end of said sleeve G. Said detent and catch-staple may, if preferred, be omitted, and springs of other forms, or an internal spiral spring, may be used. The central position of the spring S equalizes its effect on all the rings of the nesting-frame, and facilitates effecting tight joints between them and the surface-plate. Said handle-stem H with its knob K, and said guide-sleeve G with its lifting-lug $l$, constitute central handles for the utensil as a whole, and for the nesting-frame.

All the parts are designed to be made of sheet metal, (tin-plate,) except said knob K, which may preferably be of wood, said lugs and staple $l$ $c$, which may preferably be united in a single galvanized iron casting, and said spring S of suitable wire; but these, with like details of mechanical construction, shape, and proportions, form no part of my present invention as hereinafter claimed, and may be modified without departing from the latter.

For convenience I have shown in Figs. 1 and 2 four cups or bulbs, $b$, in the surface-plate, and four rings, r, in the nesting-frame. There may be less than four of each, if preferred; or their number may be multiplied, as illustrated by Fig. 4, and in egg-friers the perforations h may be omitted. With the nesting-frame F held tightly in contact with the surface-plate P by the spring S, as represented in Fig. 2, and the frame immersed in boiling water or hot fat, the utensil is ready to receive the eggs. One is broken into each bulb b within the matching ring r to the desired number or the extent of its capacity, and at this stage the stiffening effect of said bulbs tending to keep the main upper surface of the plate perfectly flat for effective coaction with the lower edges of said rings, and the tendency the bulbs give the liquid whites of the eggs away from the rings operates to prevent the spreading of the eggs beneath the rings, as aforesaid. The plate and frame with the eggs remain immersed in the boiling water or hot fat until the eggs are cooked to the required extent, and in this operation the holes h of the perforated bulbs b permit the passage of the boiling liquid upward through said bulbs, so as to rapidly cook the eggs and keep them from adhering, as aforesaid, and said marginal flange m coacts therewith to insure this result. Finally, the utensil is lifted by its upright handle K H. Said frame F is elevated relatively to said plate P by a finger or fingers applied to one or both of the lifting-lugs l. The catch-staple c is thus engaged with the spring-detent d, and the latter automatically fastens the frame temporarily in its elevated position, as represented in Fig. 3, so that the eggs may be leisurely removed from the surface-plate by means of a knife or spoon. The merging of the concavities of the bulbs b into the upper surface of said plate P facilitates inserting the knife or spoon beneath them and sliding the eggs from the plate, so as not to break them.

Having thus described my said improvement in egg-poachers and egg friers, I claim as my invention and desire to patent under this specification—

1. In combination with a superposed nesting-frame, a surface-plate having depending shallow cups or bulbs integral therewith and perforated with small holes, and a depending rim surrounding the area within which said bulbs depend, substantially as herein specified, for the purposes set forth.

2. The combination, in a utensil for poaching or frying eggs, of a surface-plate having a central handle fixedly attached thereto perpendicular to its upper surface, a superposed nesting-frame movable vertically clear of said surface-plate and having a handle by which to so lift it relatively to said surface-plate, and a central spring which normally holds said nesting-frame down upon said surface-plate, substantially as herein specified.

WM. H. SILVER.

Witnesses:
G. W. HAMMER,
WM. KLEBER.